Feb. 27, 1962

R. L. SWIGGETT 3,023,333

PRINTED CIRCUIT ARMATURE

Filed May 25, 1959

INVENTOR.
ROBERT L. SWIGGETT

BY

Charles A. Blank

ATTORNEY

Feb. 27, 1962  R. L. SWIGGETT  3,023,333
PRINTED CIRCUIT ARMATURE
Filed May 25, 1959  3 Sheets-Sheet 2
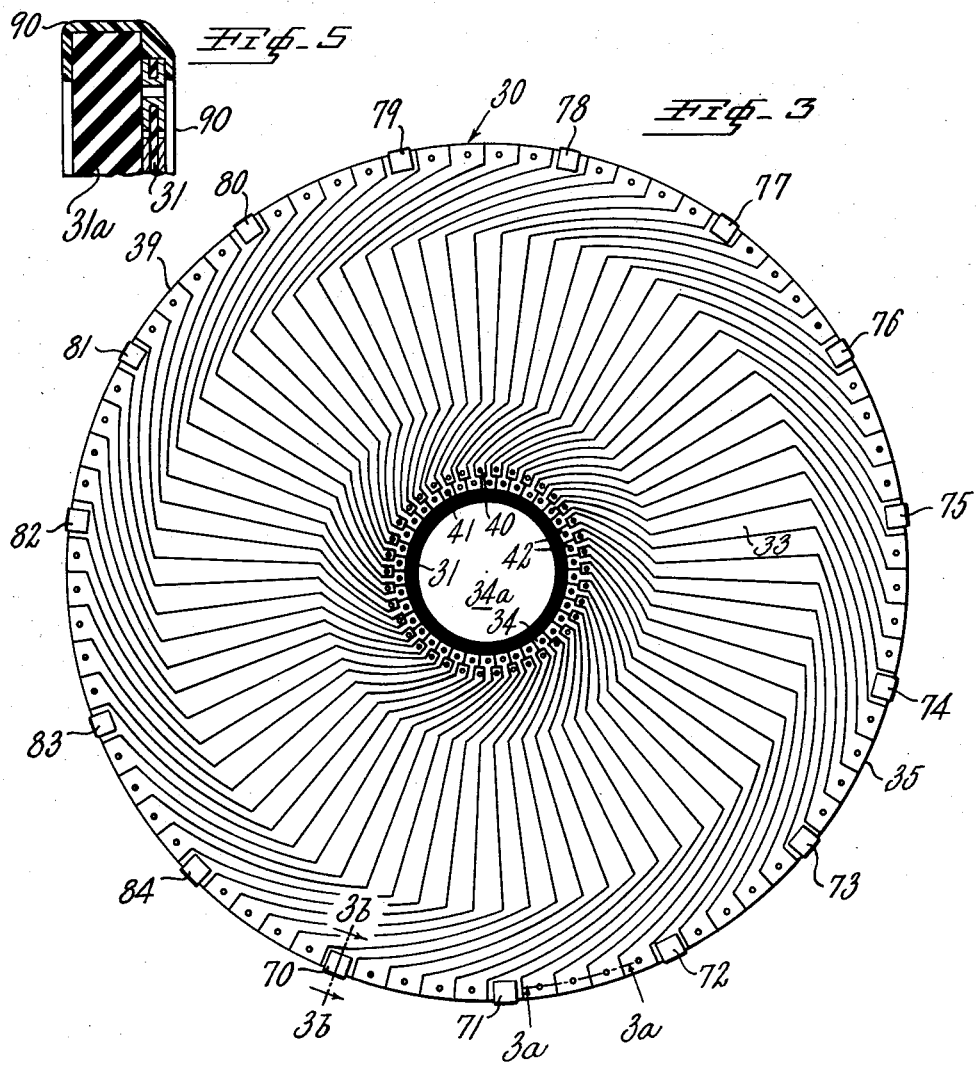
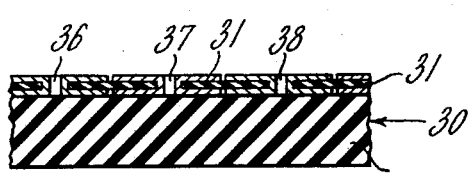
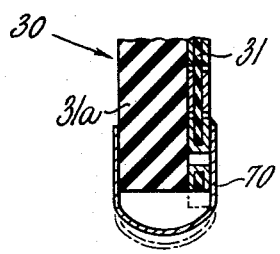
INVENTOR.
ROBERT L. SWIGGETT
BY
Charles A. Blank
ATTORNEY Feb. 27, 1962   R. L. SWIGGETT   3,023,333
PRINTED CIRCUIT ARMATURE Filed May 25, 1959   3 Sheets-Sheet 3

INVENTOR.
ROBERT L. SWIGGETT
BY Charles A. Blank

ATTORNEY

United States Patent Office 3,023,333
Patented Feb. 27, 1962

3,023,333
PRINTED CIRCUIT ARMATURE
Robert L. Swiggett, Huntington, N.Y., assignor to Printed Motors, Inc., New York, N.Y., a corporation of Delaware
Filed May 25, 1959, Ser. No. 815,531
9 Claims. (Cl. 310—268)

This invention relates to armatures for electrical rotating machines and, more particularly, to armatures for direct-current motors and generators. The invention is particularly directed to armatures having printed-circuit, plated or etched conductors.

Electrical rotating machines utilizing printed-circuit armatures are described and claimed in the copending application Serial No. 691,434, filed October 21, 1957, by F. H. Raymond and J. Henry-Baudot. Improved printed-circuit armatures suitable for use in electrical rotating machines are described and claimed in my copending application Serial No. 792,733, entitled "Conductive Device," filed February 12, 1959. In my aforesaid application, an armature is described having conductive patterns coated on the faces of a thin sheet of insulating material which is adherent to and is supported by a disc of insulating material. While such an armature provides satisfactory operation over a wide range of operating conditions, under heavy load conditions it may overheat. Differences in the rate of expansion of the conductive material may distort the attached supporting disc of insulating material beyond its elastic limit and cause permanent lateral deformation of the disc of insulating material under extreme operating conditions. During operation, the deformed armature may undesirably rub against the pole pieces of the magnets of the motor.

In a copending application of Robert P. Burr entitled "Armature," Serial 815,533, filed concurrently herewith, a new type of armature having conductive patterns coated on the faces of a thin sheet of insulating material which is non-adherent to a supporting disc of insulating material is described. While such an armature has an operating range which is extended substantially, a still further improvement is obtained in accordance with the invention described and claimed in this application.

It is an object of the present invention to provide a new and improved armature for an electrical rotating machine which is not subject to lateral deformation at high operating temperatures.

In accordance with the invention, an armature for an electrical rotating machine comprises a thin sheet of insulating material having surfaces coated with conductive patterns which have inner and outer boundaries and which have interconnections disposed in a plurality of rows near the boundaries. The armature includes an insulating disc disposed against the conductive pattern on one surface of the insulating sheet for laterally supporting the sheet. The armature also includes means for restraining lateral displacement of the sheet with respect to the disc while allowing relative displacement of the sheet with respect to the disc in the plane of the sheet.

For a better understanding of the present invention, together with other and further objects thereof, reference is made to the following description taken in connection with the accompanying drawings and its scope will be pointed out in the appended claims.

Referring to the drawings:

FIG. 3 is a plan view of the armature utilized in the FIG. 1 motor;

FIG. 3a is an enlarged sectional view taken along line 3a—3a of FIG. 3;

FIG. 3b is an enlarged sectional view taken along line 3b—3b of FIG. 3;

FIG. 5 is a fragmentary sectional view of an armature constructed in accordance with a modified form of the invention.

Figure 2:
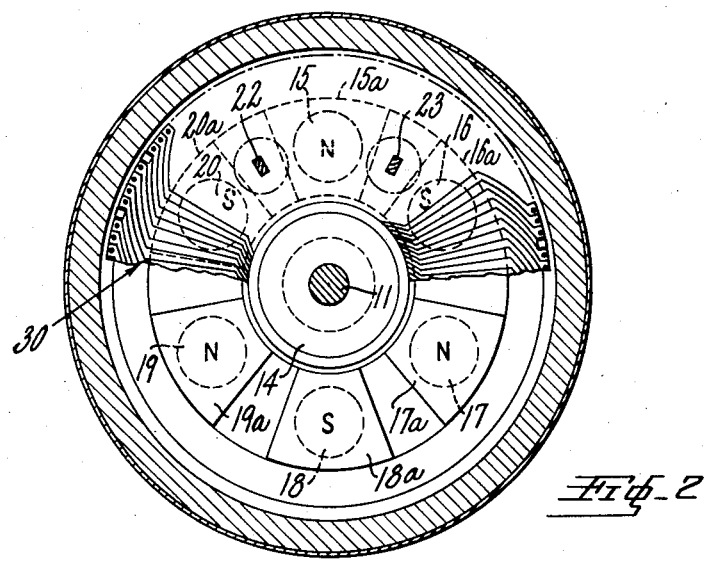
FIG. 2 is a sectional view taken along line 2—2 of FIG. 1, with the armature partly broken away.
Figure 1:
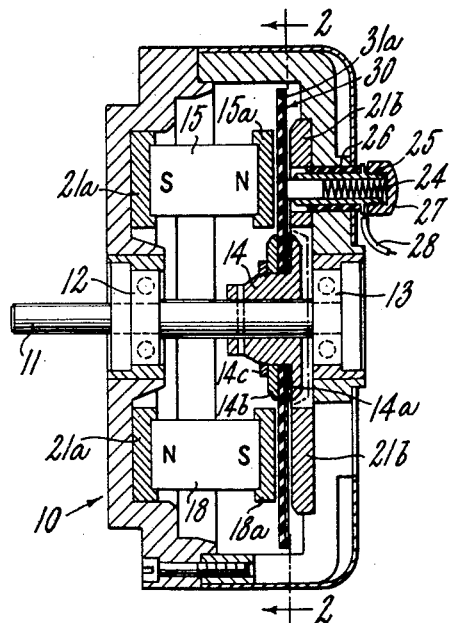
FIG. 1 is a sectional view along a central plane of a direct-current motor utilizing a printed-circuit armature constructed in accordance with the present invention with one of the brush mounts shown in section.

Referring now more particularly to FIG. 1 of the drawings, the direct-current motor there represented comprises a motor housing 10 supporting a central shaft 11 journaled in suitable bearings 12, 13. An armature 30 constructed in accordance with the invention is mounted on a suitable supporting hub 14 between an insulating washer 14a, a clamp ring 14b, and threaded nut 14c. As is apparent in FIG. 2, the motor is, for example, a six-pole motor utilizing six permanent magnets, 15 to 20, inclusive, to establish a magnetic field. Suitable pole pieces 15a to 20a, inclusive, are attached to the magnets at one end as represented in FIG. 2. An annulus 21a of ferromagnetic material is attached to the other end of the magnets to provide a path for magnetic flux. The magnets are mounted to provide fields of alternate polarity through adjacent regions of the armature as represented by the North-South symbols N—S of FIGS. 1 and 2. A ferromagnetic annulus 21b, is positioned on the other side of the armature from the magnets to minimize the air gap in the magnetic field and to complete the path for magnetic flux. Suitable brushes 22, 23, represented in section in FIG. 2, are positioned approximately midway between magnets 20 and 15 and between magnets 15 and 16 to supply current to the motor, as will be described in detail subsequently.

Referring to FIG. 1, brush 23 is maintained in position by a suitable spring 24 mounted in a sleeve 25 within an insulating support 26. A cap of insulating material 27 is threaded on the sleeve 25 for clamping an electrical lead 28 thereto. The brush 22, and a corresponding electrical lead (not shown) are similarly mounted and connected electrically.

Referring now more particularly to FIG. 3 of the drawings, the armature 30 constructed in accordance with the invention is represented in plan view. The armature comprises an insulating member having surfaces coated with conductive patterns preferably having substantially circular inner and outer boundaries and which have interconnections preferably comprising conductive coatings bounding apertures through the insulating member disposed in a plurality of circular rows in the patterns near the boundaries. More particularly, the insulating member preferably comprises a suitable sheet material such as Mylar, which is a commercially available polyester film made by E. I. du Pont de Nemours & Company, Inc., or a sheet of epoxy-glass laminate. The insulating member 31 is apparent in FIG. 3a which is a sectional view of a portion of the armature along lines 3a—3a of FIG. 3. The Mylar sheet preferably is a film having a thickness of, for example, .005 inch. The Mylar sheet is also represented by the lines representing conductor boundaries in FIG. 3. The conductive pattern represented in FIG. 3 is repeated on the other side of the sheet 31, partially represented in FIG. 4, which is a fragmentary view of the armature and its conductive patterns. Thus, the armature pattern on each side of the sheet 31 appears as represented in FIG. 3 when each pattern is viewed from the side of the sheet 31 on which that pattern appears. The radial portions 33 of the conductors on both sides of the armature may coincide. The conductive patterns will be described in detail subsequently.

The insulating sheet 31 has a centrally located aperture 34a. An insulating disc 31a is disposed against the conductive pattern on one surface of the sheet 31 for laterally supporting the sheet. The disc 31a may, for example, be an epoxy-glass laminate of circular shape having a centrally located aperture. This disc 31a is not adherent to the sheet 31 to allow thermal dimensional changes of the conductive patterns on the sheet with respect to the disc 31a. Means comprising hub 14, insulator 14a, clamp ring 14b and threaded nut 14c clamp the insulating sheet 31 against the disc 31a along the periphery of the armature shaft. Thus, thermal dimensional changes of the conductive patterns on the insulating sheet can occur radially with respect to the disc 31a. Accordingly, thermal expansions of the conductive patterns cannot distort and bend the disc 31a beyond its elastic limit.

The armature also includes means for restraining lateral displacement of the sheet 31 with respect to the disc 31a while allowing relative displacement of the sheet 31 with respect to the disc 31a in the plane of the sheet. More particularly, this means comprises, for example, a plurality of tabs 70–84, inclusive, disposed at the outer boundary of the conductive patterns and individually attached to the individual conductors of the conductive pattern, as represented in FIGS. 3 and 3b. The tabs preferably are resilient copper tabs serving as spring fingers spaced from each other by less than ten conductors for maintaining the outer edge of the sheet against the disc.

Alternatively, the tabs may be attached to the disc 31a rather than the sheet 31 and the tabs may be suitably insulated from the conductors by a suitable insulating ring disposed between the tabs and the conductors. In lieu of tabs, the restraining means may, for example, be an elastic plastic ring 90, represented in fragmentary section in FIG. 5, which snaps over the edges of the sheet 31 and the disc 31a to clamp the sheet 31 and disc 31a together laterally while allowing relative radial displacement of the sheet with respect to the disc.

The conductive patterns preferably have substantially circular inner and outer boundaries 34 and 35. Interconnections between the conductive patterns comprise conductive coatings, for example, 36, 37, and 38 of FIG. 3a, bounding apertures through the insulating material and disposed in a plurality of substantially circular rows 39, 40 and 41 near the boundaries. The interconnections in the outermost circle 39 are connected to all conductors of the conductive patterns. The interconnections in the innermost circle 41 are connected to alternate conductors in each conductive pattern. The interconnections in the other inner circle 40 are connected to conductors intervening the alternate conductors in the conductive patterns. The alternate conductors connected to the innermost circle 41 are terminated in closely spaced adjacent conductive regions 42, 42 separated by insulating material. The intervening conductors are terminated on each face of the sheet 31 by conductive regions separated by the alternate conductors and insulating material.

Thus it will be seen in FIG. 3 that alternate connections to the conductors are staggered, that is, connections to alternate conductors are in the innermost circle 41 and connections to the intervening conductors are in the adjacent circle 40, preferably midway between the apertures of circle 41. This construction of the armature is of importance because it provides substantial regions of the conductors in which coated apertures are located. The apertures may, therefore, be of substantial size, for example, .02 inch on a circle of .7 inch diameter, permitting a coating of sufficient thickness and area to conduct the necessary current. This construction of the conductors with the apertures arranged in a plurality of circular rows near the central apertures 34a makes the manufacture of small armatures commercially practical.

Figure 4:
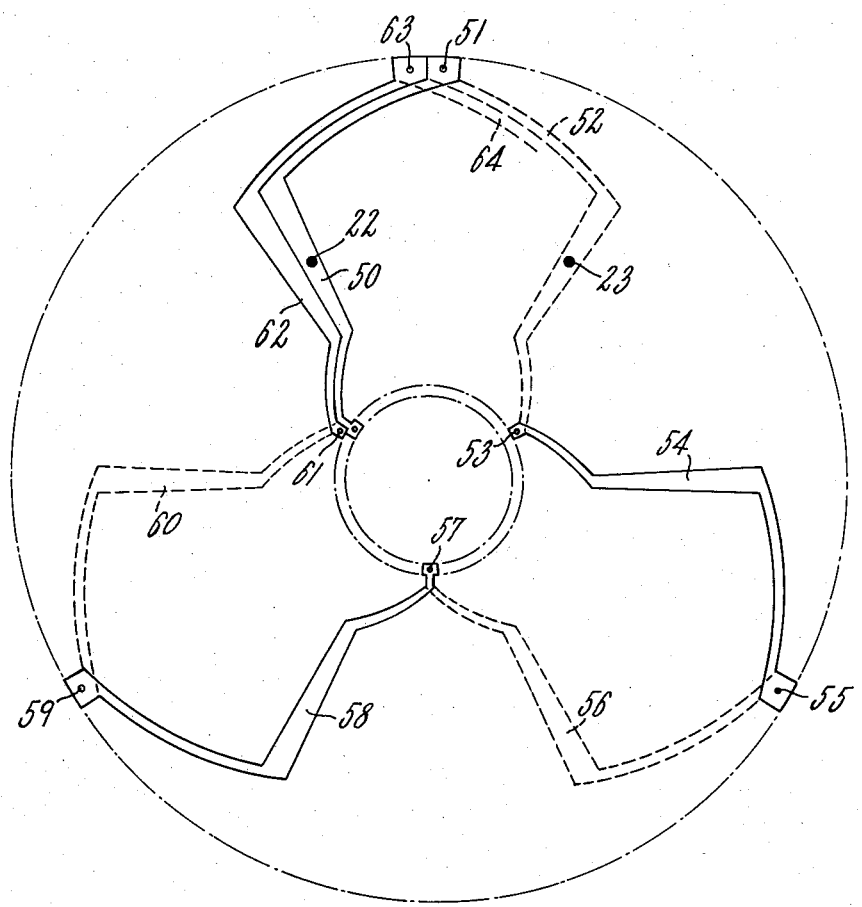
FIG. 4 is a fragmentary plan view of the FIG. 3 armature to represent conductive patterns on both sides of the armature.

The conductor pattern and the corresponding pattern for current flow through the armature will be partially traced with reference to FIG. 4. Assuming current to enter the motor at brush 22 disposed in contact with conductor 50, current flows along conductor 50 through aperture 51 to conductor 52 on the other side of the insulating sheet, through aperture 53 along conductor 54, through aperture 55 along conductor 56 on the other side of the insulating sheet, through aperture 57 along conductor 58, through aperture 59 along conductor 60 on the other side of the insulating sheet, and through aperture 61 along conductor 62 adjacent conductor 50. Current continues along conductor 62 through aperture 63 along conductor 64 on the other side of the insulating sheet adjacent conductor 52. Current flow continues in this manner through the conductors of the armature until it reaches the final conductor (not shown) on the face of the same sheet as conductor 50 and directly under brush 23.

A method of manufacturing the armature will be briefly described. A sheet of Mylar is drilled, perforated or punched to form apertures in the pattern represented in FIG. 3. The sheet is then coated with a copper film on all exposed surfaces, including the walls of the apertures, to a thickness of approximately .00001 inch by immersion in an electroless copper deposition solution ordinarily employed in the manufacture of printed circuits. The copper-coated faces are then coated with a suitable screen printing-ink plating resist, known to the art, which resists copper electroplating and which is printed on the copper to form the pattern to be etched, represented by the black lines of FIG. 3. The armature is then copper-plated on its faces and through its apertures. After plating to the desired copper thickness (for example, approximately .005 for a three inch diameter armature), the part is removed from the electroplating bath and the ink is cleaned off, leaving exposed the thin electroless copper film which was under the ink. The armature is then immersed briefly in an etching solution, which removes the thin electroless copper film which was under the ink to form the conductors represented in FIG. 3.

It should also be understood that the conductive coating on the surfaces of the insulating sheet may comprise, for example, a copper-foil material which is laminated to the insulating sheet and is subsequently etched. Also, the conductively coated apertures through the insulating material may be filled with conductive or insulating material, if desired. Copper tabs may then be individually soldered or otherwise attached to the conductors of the armature and bent over the insulating disc 31a, as represented in FIGS. 3 and 3b, to maintain the coated sheet 31 against the disc 31a and prevent lateral deformation of the coated sheet 31.

I have found that an armature utilizing restraining means in accordance with the invention is capable of operating at higher temperatures without suffering deformation than those at which it could otherwise operate. This is because the armature is clamped at the hub 14 and at temperatures above, for example, 200° F., radial expansion of the conductive patterns becomes sufficiently great that the conductors, if unrestrained laterally, bend away from the insulating disc 31a into a more or less cup shaped configuration. The conductors may then rub against the pole pieces of the magnet. However, an armature constructed in accordance with the present invention is not subject to such lateral deformation over an extremely wide range of operating temperatures. As represented in FIG. 3b, when the armature 30 rises in temperature the metal coating on the sheet 31 expands and the clamp 70 is displaced to the position represented in broken-line construction. Thus, the coated sheet of insulating material is displaceable radially with respect to the insulating disc but is clamped to restrain lateral deformation of the sheet with respect to the disc. The Mylar insulating sheet is stretched but its insulating qualities are not affected because they are highly resistant to temperatures of the order of magnitude encountered during operation of the machine. The Mylar sheet is sufficiently thin that any deformation of that sheet does not laterally deform the armature.

While I do not wish my invention to be limited to any particular set of dimensions, the following are representative dimensions which have been successfully employed in an embodiment constructed in accordance with the invention for use with an eight-pole motor of generally similar construction to the six-pole motor represented in the drawings:

| | |
|---|---|
| Outer diameter of conductive pattern____inches__ | 3.6 |
| Inner diameter of conductive pattern_____inch__ | 0.70 |
| Number of conductors on each surface___inches__ | 76 |
| Thickness of Mylar sheet 31_____inch__ | .005 |
| Thickness of conductors 33_____do____ | .004 |
| Diameter of apertures in row 39_____do____ | .030 |
| Diameter of apertures in row 40_____do____ | .020 |
| Diameter of apertures in row 41_____do____ | .020 |
| Center-to-center spacing of apertures in row 39 _____inch__ | 0.150 |
| Center-to-center spacing of apertures in row 40 _____inch__ | 0.070 |
| Center-to-center spacing of apertures in row 41 _____inch__ | 0.060 |
| Adjacent edge spacing between conductors 33 inch__ | .005 |
| Width of alternate conductors between apertures or row 40 _____inch__ | .020 |
| Width of intervening conductors at row 40_do____ | .030 |
| Width of intervening conductors at inner boundary 34 _____inch__ | .050 |
| Maximum width of central radial portions of conductors 33 _____inch__ | 0.110 |
| Thickness of supporting disc 31a_____do____ | .030 |
| Spacing of copper fingers_____do____ | 0.600 |
| Width of copper fingers_____do____ | 0.080 |
| Thickness of copper fingers_____do____ | 0.005 |
| Length of copper fingers_____do____ | 0.090 |

An eight-pole motor having an armature constructed in accordance with the invention was operated for several hours at a speed of 2,000 r.p.m. at an input voltage of 7 volts under load conditions drawing an input current of 8.5 amperes. The magnet pole pieces reached a temperature of 289° F. and no undesirable rubbing of the pole pieces occurred.

From the foregoing description, it will be apparent that an armature constructed in accordance with the invention is substantially free from lateral deformation of the conductively coated sheet which might otherwise occur due to variations of operating temperature over a wide range, causing the armature to rub against the pole pieces of the magnet. An armature constructed in accordance with the invention is capable of operating at extremely high temperatures. Armatures for diverse purposes may be constructed by utilizing a conductively coated insulating film with supporting discs selected from a wide range of insulating materials, for example, glass, ceramic, epoxy, Bakelite or paper compositions. Also, the supporting disc may be conductive and covered by insulating material to provide eddy-current damping.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. An armature for an electrical rotating machine comprising: a thin sheet of insulating material having surfaces coated with conductive patterns which have inner and outer boundaries and which have interconnections disposed in a plurality of rows near said boundaries, an insulating disc disposed against the conductive pattern on one surface of said sheet for latterally supporting said sheet, and means for restraining lateral displacement of said sheet with respect to said disc while allowing relative displacement of said sheet with respect to said disc in the plane of said sheet.

2. An armature for an electrical rotating machine comprising: a thin sheet of insulating material having surfaces coated with conductive patterns which have substantially circular inner and outer boundaries and which have interconnections comprising conductive coatings bounding apertures through said insulating material disposed in a plurality of substantially circular rows in said patterns near said boundaries, a circular insulating disc disposed against the conductive pattern on one surface of said sheet for laterally supporting said sheet, and means for restraining lateral displacement of said sheet with respect to said disc while allowing relative radial displacement of said sheet with respect to said disc.

3. An armature for an electrical rotating machine comprising: a thin sheet of insulating material having surfaces coated with conductive patterns which have inner and outer boundaries and which have interconnections disposed in a plurality of rows in said patterns near said boundaries, an insulating disc disposed against the conductive pattern on one surface of said sheet for laterally supporting said sheet, said disc being non-adherent to said sheet to allow thermal dimensional changes of said conductive patterns with respect to said disc, and means for restraining lateral deformation of said sheet with respect to said disc while allowing relative displacement of said sheet with respect to said disc in the plane of said sheet.

4. An armature for an electrical rotating machine comprising: a thin sheet of insulating material having surfaces coated with conductive patterns which have inner and outer boundaries and which have interconnections comprising conductive coatings bounding apertures through said insulating material disposed in a plurality of rows in said patterns near said boundaries, an insulating disc disposed against the conductive pattern on one surface of said sheet for laterally supporting said sheet, and resilient means disposed at said outer boundary of said conductive patterns for restraining lateral displacement of said sheet with respect to said disc while allowing relative displacement of said sheet with respect to said disc in the plane of said sheet.

5. An armature for an electrical rotating machine comprising: a thin sheet of insulating material having surfaces coated with conductive patterns which have inner and outer boundaries and which have interconnections comprising conductive coatings bounding apertures through said insulating material disposed in a plurality of rows in said patterns near said boundaries, an insulating disc disposed against the conductive pattern on one surface of said sheet for laterally supporting said sheet, and means comprising a plurality of tabs at said outer boundary of said patterns for restraining lateral displacement of said sheet with respect to said disc while allowing relative displacement of said sheet with respect to said disc in the plane of said sheet.

6. An armature for an electrical rotating machine comprising: a thin sheet of insulating material having surfaces coated with patterns of individual conductors which have inner and outer boundaries and which have interconnections comprising conductive coatings bounding apertures through said insulating material disposed in a plurality of rows in said patterns near said boundaries, an insulating disc disposed against the conductor pattern on one surface of said sheet for laterally supporting said sheet, and means comprising a plurality of resilient tabs individually attached to the individual conductors of the conductor pattern on the other surface of said sheet for maintaining said sheet against said disc while allowing relative displacement of said sheet with respect to said disc in the plane of said sheet, whereby deformation of the armature due to variations of operating temperature over a wide range is minimized.

7. An armature for an electrical rotating machine comprising: a thin sheet of insulating material having surfaces coated with patterns of individual conductors which have inner and outer boundaries and which have interconnections comprising conductive coatings bounding apertures through said insulating material disposed in a plurality of rows in said patterns near said boundaries, an insulating disc disposed against the conductor pattern on one surface of said sheet for laterally supporting said sheet, and means comprising resilient metal tabs individually attached to the individual conductors of the pattern on the other surface of said sheet at said outer boundary of said patterns and spaced from each other by less than ten conductors for maintaining said sheet against said disc while allowing relative displacement of said sheet with respect to said disc in the plane of said sheet, whereby deformation of the armature due to variations of operating temperature over a wide range is minimized.

8. An armature for an electrical rotating machine comprising: a rotary shaft, a thin sheet of insulating material having a centrally located aperture of substantially circular boundary for mounting the sheet on said shaft and having surfaces coated with patterns of individual conductors which have substantially circular inner and outer boundaries and which have interconnections comprising conductive coatings bounding apertures through said insulating material disposed in a plurality of substantially circular rows in said patterns near said boundaries, a circular insulating disc having a centrally located aperture for mounting said disc on said shaft and disposed against the conductor pattern on one surface of said sheet for laterally supporting said sheet, means for clamping said sheet to said disc along the periphery of said shaft, said disc being non-adherent to said sheet to allow thermal dimensional changes of said conductor patterns with respect to said disc, and means comprising a plurality of resilient metal tabs attached to the individual conductors of the conductor pattern on the other surface of said sheet for maintaining said sheet against said disc at the outer edge of said conductor patterns while allowing relative displacement of said sheet with respect to said disc in the plane of said sheet, whereby deformation of the armature due to variations of operating temperature over a wide range is minimized.

9. An armature for an electrical rotating machine comprising: a thin sheet of insulating material having surfaces coated with conductive patterns which have inner and outer boundaries and which have interconnections disposed in a plurality of rows in said patterns near said boundaries, an insulating disc disposed against the conductive pattern on one surface of said sheet for laterally supporting said sheet, and a resilient ring disposed over the edges of said sheet and said disc for restraining lateral displacement of said sheet with respect to said disc while allowing relative displacement of said sheet with respect to said disc in the plane of said sheet.

References Cited in the file of this patent

UNITED STATES PATENTS

| | | |
|---|---|---|
| 959,120 | Dean | May 24, 1910 |
| 2,900,580 | Beck | Aug. 18, 1959 |
| 2,911,605 | Wales | Nov. 3, 1959 |

OTHER REFERENCES

"Printed Circuit Armature," Electronic Design, March 4, 1959.